Feb. 25, 1930.   H. E. CHRISTIE ET AL   1,748,596
INDICATOR FOR THE COOLING SYSTEMS OF AUTOMOBILES
Filed June 7, 1927    2 Sheets-Sheet 1
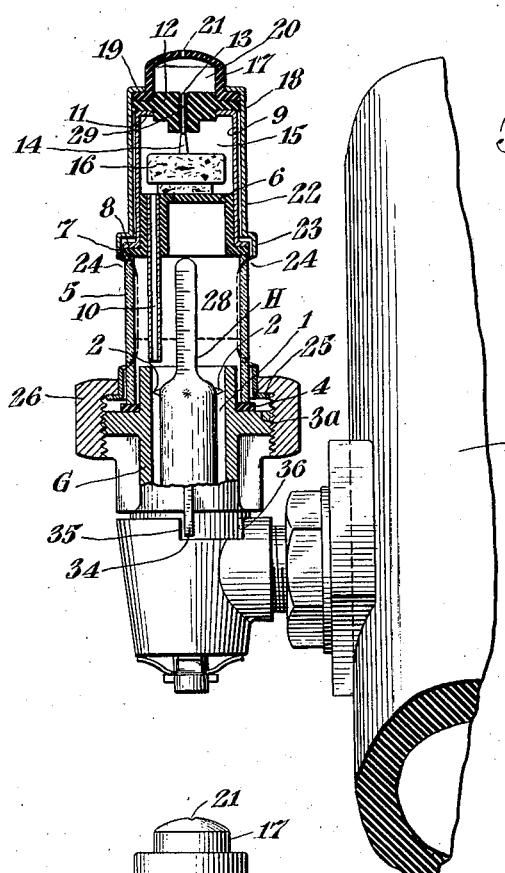
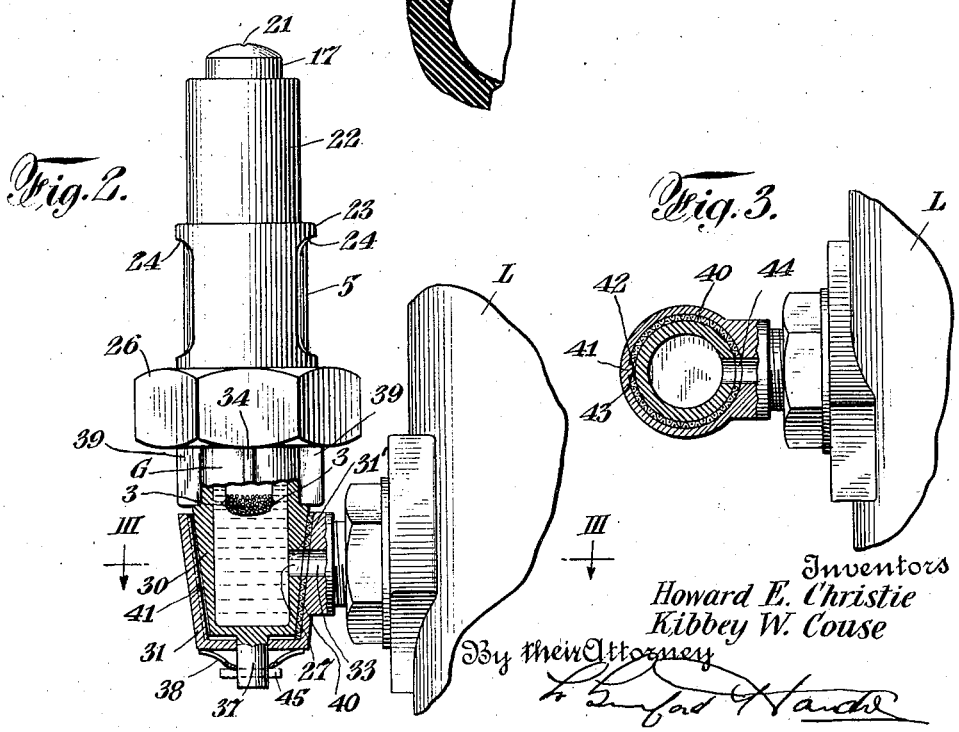
Inventors
Howard E. Christie
Kibbey W. Couse
By their Attorney

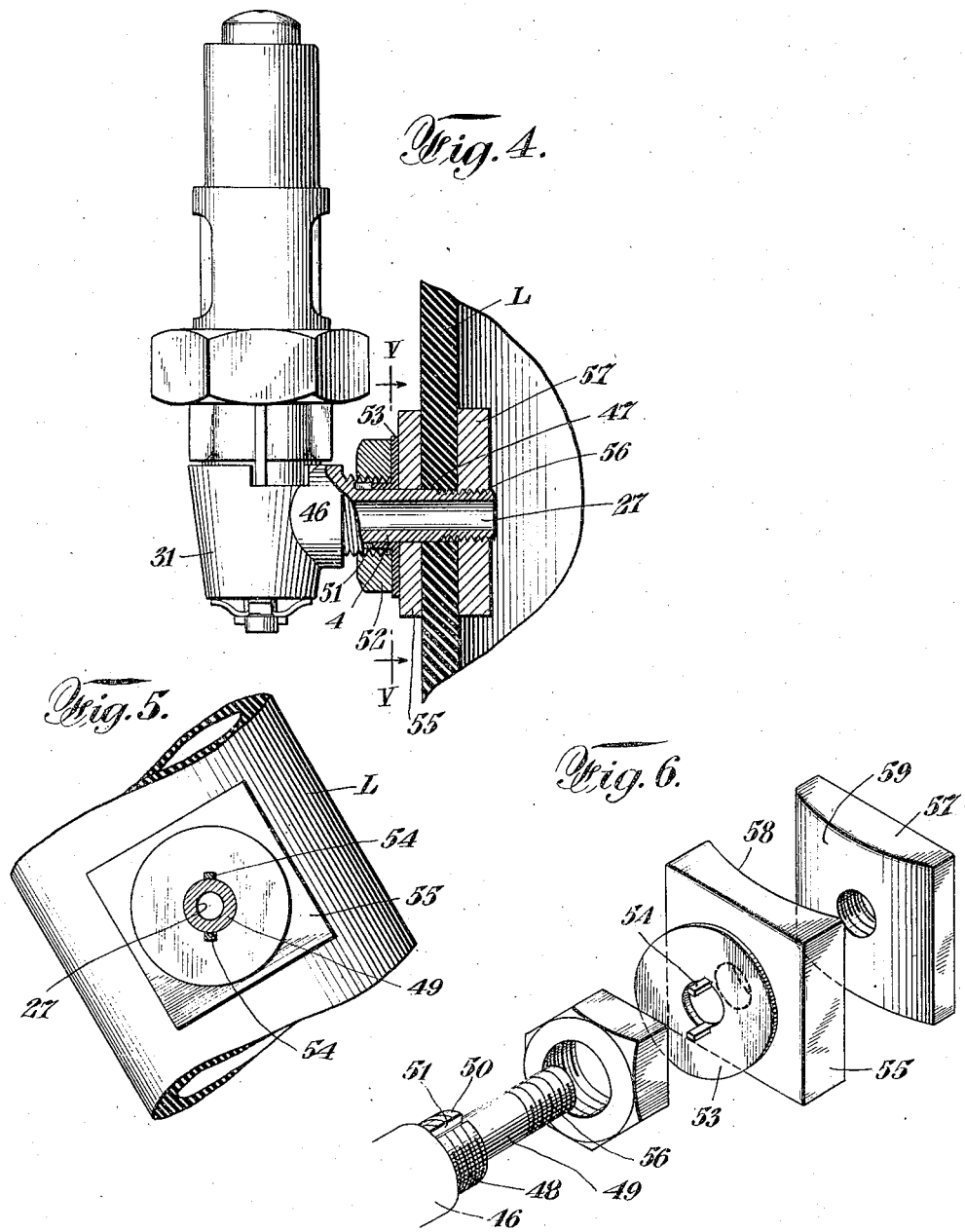

Patented Feb. 25, 1930

1,748,596

UNITED STATES PATENT OFFICE

HOWARD E. CHRISTIE AND KIBBEY W. COUSE, OF BRONX, NEW YORK

INDICATOR FOR THE COOLING SYSTEMS OF AUTOMOBILES

Application filed June 7, 1927. Serial No. 197,190.

This invention relates to an indicator for the cooling system of automobiles or otherwise, the same being in the nature of an improvement upon the structure shown and described in our pending application Serial No. 137,278, filed September 23rd, 1926.

An object of the present invention is to provide improved features of construction of the casing whereby the mechanism is more efficient in its operation and more easily cleaned interiorally.

A further object is to provide a convenient and efficient means for controlling the flow of cooling fluid between the engine cooling system and the hydrometer casing.

A further object is to provide improved means for connecting the device to the cooling system.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which we have shown merely a preferred form of embodiment of the invention:—

Fig. 1 is a vertical transverse sectional view through an indicator device constructed in accordance with this invention and showing the same connected with the cooling system of an automobile engine, the lower portion of the casing of the indicator device being shown in side elevation.

Fig. 2 is a similar view, the lower portion of the casing being here shown in section and the upper portion being in side elevation.

Fig. 3 is a horizontal sectional view taken upon the plane of line III—III of Fig. 2.

Fig. 4 is a view similar to Figs. 1 and 2, the entire casing being here shown in side elevation however and the extension therefrom by which the casing is connected to the automobile cooling system being in vertical section.

Fig. 5 is a vertical transverse sectional view taken upon the plane of line V—V of Fig. 4, and Fig. 6 is a perspective view illustrating in separated positions the several parts by which the indicator device may be connected with the hose portion of an automobile engine cooling system.

Referring to the drawings for describing in detail the structure shown therein, the reference character L indicates a part of the cooling system of an automobile engine, as for instance the flexible connecting pipe which is usually employed extending between the upper part of the engine and the upper part of the automobile radiator.

The indicator device comprises a body member G which has a vertical annular central bore 1 arranged to accommodate the hydrometer float H so that said float is free to move vertically therein. The body G is preferably formed of metal and the interior wall surface of the bore 1 thereof is smooth and even throughout its length so that the float H may have uninterrupted vertical movement therein, the float being provided with an upper set of pointed projections as 2—2 thereon and a lower set of pointed projections as 3—3 thereon adapted to have appropriate contact with the smooth metallic surface of the bore 1 to thereby maintain the float in substantial vertical alignment with said bore at all times.

Resting upon an upper annular shoulder as 3ª of the body G is a gasket 4 upon which rests in turn the lower end of a transparent glass tube 5. The upper portion of the body G extends upwardly into the tube 5 and serves to hold said tube in substantially concentric alignment with the body.

At the upper end of the glass tube 5 is a partition member 6 formed preferably of rubber or other like material. This partition member has a lower annular flange 7 which rests directly upon the upper annular edge of the glass tube 5, and upon the upper annular surface of said flange rests an annular edge flange as 8 which is formed at the lower end of a tubular spacer member 9. The main bulk of the partition 6 extends upwardly into the lower end of the spacer 9 and is formed to support a small tube 10 which extends downwardly into the glass tube 5 and to a point adjacent the upper end of the body G, the upper end of said tube opening through the upper surface of the partition.

The upper end of the spacer 9 is flanged inwardly as at 11 and resting upon said flange 11 is a closure member 12 made preferably of rubber. This closure member is provided with a central passage-way or vent opening 13 vertically therethrough and into the lower end of this opening projects a small metallic valve element 14 which when it is lifted against the walls of said opening serves to close the opening against possible outflow of fluid through the opening. When the valve is lowered however air may readily move upwardly or downwardly through the opening.

The spacer 9 is of such length vertically as to hold the closure member 12 spaced above the upper surface of the partition 6 so as to provide a valve-float chamber 15 within the spacer between the partition and the closure. The valve 14 extends downwardly into this chamber and rests upon, or is firmly fixed to, the upper surface of a float member 16 of cork or other appropriate light material.

Upon the upper annular surface portion of the closure 12 rests a cap piece 17 held thereto by means of an outer casing or shell 18 said shell being formed with an inturned annular shoulder or flange 19 at its upper end engaging over the annular edge portion of said cap.

The central portion of the cap piece 17 is raised so as to define a small compartment as 20 therein above the upper surface of closure 12, and an aperture as 21 is provided centrally through the upper wall of said cap. The cap is made of flexible rubber and is intended for use as a manually operable pump in the same manner as in the pending application referred to and as will be presently herein mentioned.

The casing or shell 18 at its upper portion as at 22 is of a size to loosely surround the spacer 9 but preferably having an appropriate fit thereto suitable to retain the spacer and casing substantially in axial alignment.

Adjacent the lower end of the spacer the casing is enlarged as at 23 to loosely fit over and about the joint between the spacer, the partition and the glass tube, and the lower portion of the casing continues downwardly about the glass tube and is provided with suitable windows as 24—24 so that the hydrometer may be visible through the glass tube.

At its extreme lower end the casing is formed with an outwardly flaring annular flange 25 about which engages a collar 26 which has threaded engagement with the body G.

From this structure it will be apparent that after the parts are all loosely assembled as described rotation of the collar 26 with respect to the body G to move the collar downwardly about the body will draw downwardly the casing or shell 18 which will press firmly together the cap 17, closure 12 and spacer 9 at the upper end of the structure, the pressure being transmitted downwardly through the spacer 9 to press the spacer and the partition 6 firmly against the upper end of the glass tube 5, and the pressure being further transmitted downwardly through the glass tube to press the lower end of the glass tube against the gasket 4, and thus seal at one time all of the joints comprised in the structure. Meanwhile the casing or shell 18 will serve to hold all of the parts in proper axial alignment and protect said parts and the joints therebetween from injury. The casing also presents an attractive exterior appearance and exposes an ample expanse of the glass tube, through the windows 24, so that the reading of the hydrometer may be conveniently taken.

The operation of the mechanism as thus far described will now be referred to as follows:

The lower end of the device being in communication with the interior of pipe L through passage 27, fluid will move into the interior of the body G from said pipe L and rise within said body. The air contained within the device above the fluid will pass outwardly through the tube 10, through the valve-float chamber 15 and through the openings 13 and 21. When the fluid has raised to a point shutting off the lower end of tube 10 it will no longer rise within the upper portion of the hydrometer compartment but will continue upwardly through the tube 10 and lift the float 16. The lifting of float 16 will move the valve 14 into the opening 13 and thus close said opening and shut off further upward movement of the fluid.

An artificial level of the fluid, as at 28, is in this way established within the hydrometer compartment and the hydrometer H will float in the fluid to give a reading at said level in the same manner as heretofore.

If by leakage or otherwise the artificial level should rise, it may be readily re-established at any time by simply operating the cap or pump 19 to force air downwardly through the opening 13 and through the tube 10 into the hydrometer compartment until the level has been again forced downwardly to or near the lower end of said tube 10.

Operation of the pump may be performed by the operator by simply pressing his finger downwardly against the upper surface of the cap 17. This will close the opening 21 and the finger pressure will collapse said cap and force air therefrom through opening 13. Release of the finger pressure will allow more air to enter through opening 21, and the operation may be repeated as often as may be necessary to accomplish the desired results.

It is here particularly pointed out that the valve 14 has a spindle-like portion as 29 projecting upwardly therefrom loosely within the opening 13. When the float 16 is down and the valve is open the upper end of the spindle 29 stands approximately at the level of the upper surface of the closure 12 but when the float is raised and the valve is closed the upper end of the spindle projects an appreciable distance above the top surface of the closure so that it will be engaged and forced down by the top wall of the cap 17 when said top wall is flexed downwardly in the pumping operation of the cap.

A free passage-way through the opening 13 may thus be insured by the operator at any time.

Due to various causes it sometimes occurs that the level of the fluid within the hydrometer compartment falls below its intended position, the opening 13 having become clogged, by the valve 14, or otherwise. The provision for manually clearing the opening 13 as just recited is important in this connection since if when the operator desires to take a reading of the hydrometer he finds the level of the fluid to be too low, he has simply to press downwardly the upper wall of the cap 17 and thus agitate the spindle 29 and free the valve from opening 13 so that the confined air may escape and permit the immediate rise of the fluid to its normal level within the hydrometer chamber.

It is desirable that at certain intervals the interior of the device thus far described should be cleaned, and it is to be noted in this connection that by disconnecting the collar 26 from body G all of the parts within the casing 18 may be readily lifted out and separated for cleaning, and as readily returned to operative position. The hydrometer float, and the interior of body G will be exposed and accessible for easy cleaning at the same time.

In order to prevent escape of fluid from pipe L when the parts of the device described are disassembled, it being recalled that the entire mechanism of this invention is located below the normal level of the cooling fluid in the cooling system of the automobile or the like, it is a feature of this invention to provide means for shutting off the opening or passage 27 at will.

To this end the lower portion as 30 of body G is formed in a manner similar to an ordinary plug valve and is rotatably mounted within a base member 31, the plug portion 30 being formed with one portion as 31' of the passage 27 and the base being formed with a continuing portion as 33 of said passage so that rotary movement of the plug within the base will open and close said passage at will.

A suitable stop member as 34 is provided upon the body G operable between opposing shoulders 35 and 36 of the base for limiting opposite extremes of movement of the body and for thereby determining the "open" and "closed" position of the body.

At the extreme lower end of the plug portion 30 a central lug 37 is formed projecting downwardly through the lower end of the base and carrying a spring washer 38 thereon which presses against the under-surface of the base for exerting continually a spring pressure holding the body firmly within the base but yet permitting desired relative rotation.

The manner in which the collar 26 is threaded upon the body G is important in that the arrangement of the threads bears such relation to the passage-forming parts 32 and 33 and the stops 34—36 that when the collar is rotated in a direction to clamp the parts of the mechanism together as above described the stop 34 will be urged against the shoulder stop 35 and the passage 27 will be open, whereas when the collar is rotated in a direction to release the parts of the mechanism above described the stop 34 will be urged against the shoulder stop 36 and the passage 27 will be closed.

The body G is preferably provided with additional means, as the fins or projections 39—39, by which it may be gripped and turned independently of the collar 26 if desired.

If desired a gasket member as 40 may be arranged within the base 31 encircling the plug portion of the body G to receive wear therefrom and to insure a tight joint and a smooth rotary movement. It is desirable that the gasket member should not rotate, and to this end the base 31 is formed interiorly with a small vertical rib 41 therein arranged to be engaged by the gasket for defining the location of the gasket.

The use of this gasket also avoids necessity for fine machine work, or grinding, of the adjacent surfaces of the plug portion and base 31, ordinary dye-castings being found sufficiently smooth where the gasket is employed.

The gasket may be formed from any appropriate material but a woven fabric impregnated with suitable lubricating and filling material has been found suitable. It is formed from a thin sheet of this material cut into proper shape to fit within the base so that its opposite end portions, as at 42 and 43, stand at opposite sides of the rib 41, an opening as 44 being arranged in alignment with the passage 27 and held in that position by the rib 41.

Any suitable means may be employed for retaining the body G assembled with the base 31 but preferably a simple cross-pin as 45 is arranged to extend through the lug 37 beneath the spring washer 38, said pin 45 being removable at will to release the washer and consequently to release the body from the base whenever this may be found desirable, the pin being again readily returnable to position holding the parts assembled as required.

It is also a feature of this invention to provide means by which the mechanism above described may be correctly and easily attached to the hose or pipe L.

For this purpose the drawing illustrates the base 31 to be provided with an integral lateral extension 46 extending therefrom through which the passage 27 continues, said extension being intended to project through an opening as 47 provided in the wall of the pipe or hose L for carrying the passage 27 into the interior of said pipe.

The extension 46 is of two distinct exterior diameters, being relatively large adjacent to the base 31, as at 48, and being reduced beyond the portion 48 as at 49, an annular shoulder as 50 occurring between these two portions. The portion 48 is threaded and provided with diametrically opposite grooves as 51—51 longitudinally thereof, a clamp nut as 52 engaging the threads and bridging said grooves.

A washer 53 is arranged upon the portion 49, being longitudinally slidable therealong and having a pair of laterally extending fingers 54—54 arranged to engage within the grooves 51—51 so that said washer will be positively held against any appreciable rotary movement upon the extension.

Between the washer 53 and the outer surface of the hose L is arranged a clamp plate 55 slidably and rotatably mounted upon the portion 49 of the extension.

The end part of the portion 49 is threaded as at 56 and a nut as 57 engages therewith.

The opposing surfaces as 58 and 59 of the clamp plate 55 and nut 57 respectively are curved to conform approximately to the curvature of the wall of the hose or pipe L.

In assembling these parts upon the hose the nut 52, washer 53 and clamp plate 55 are placed in position upon the extension 46, the nut 52 being threaded back upon the portion 48 of the extension so that the washer 53 engages against the shoulder 50 of the extension. The portion 49 of the extension is then introduced through opening 47 of the hose and the nut 57 is threaded onto the projecting end of the extension within the hose sufficiently to hold the nut 57 assembled with the other parts. Thereupon the base 31, and with it of course the extension 46, is rotated to feed the threads of the portion 49 into the nut 57, the nut 57 and the clamp plate 55 being at this time held so that the curved surfaces 58 and 59 thereof will properly mate the curvature of the hose. The rotary movement of the base 31 is continued until the parts are approximately tight upon the hose. The final tightening movement of the clamp plate and nut against the interposed portion of the hose may be accomplished by rotation of the nut 52 to simply drive the washer 53 outwardly toward the hose, this movement being accomplished without rotary movement of the base 31 relative to the hose.

The advantage of this arrangement will be apparent when it is understood that although the hose may be in any one of a variety of different positions with respect to the vertical, according to the type of engine or automobile to which the present invention is being applied, the base 31 and the indicator parts carried thereby must of necessity stand substantially vertical when the article is fully attached onto the hose. Attachment of the nut 57 onto the extension within the hose may be easily accomplished since it is not necessary to move said nut to a tightened position by manipulation thereof within the hose. The rotary movement of the base 31 for bringing the parts to an approximately tightened condition may be performed without difficulty, in some instances being facilitated by disengaging the body G from the base whenever desirable. Occasionally it may happen that a proper tightness of the parts upon the hose will be effected by final rotary movement of the base to an exactly vertical position, in which event no relative rotary movement of the nut 52 will be required. But if a final tightness of the parts against the hose is attained when the base is in other than a vertical position the base may be rotated backwardly to vertical and a final clamping action be effected by rotating the nut 52. Of course if desired the workman may rotate the base sufficiently to attain approximate tightness against the hose and then while holding the base in a vertical position rotate the nut 52 to effect final tightness, thus avoiding backward rotation of the base.

The fact that the body G, and the parts carried thereon, is rotatably detachable from the base, and readily returnable to the base, greatly facilitates the operation of the parts for connecting the base with the hose, as it frequently happens that interfering parts of the automobile structure are in too close proximity to the hose to permit of rotary movement of the entire device.

As many changes could be made in this construction without departing from the scope of the invention, as defined in the following claims, it is intended that all matter contained in the above description or shown in the accompanying drawings, shall be interpreted as illustrative only and not in a limiting sense.

Having thus described our invention, what we claim as new and desire to secure by Letters Patent is:—

1. An indicator device for a cooling system of the type set forth, said indicator device comprising a transparent tube, a hollow body part upon which the tube rests in continuation of the hollow of said body part, a hydrometer device arranged within the hollow of said body part adapted to project into said tube, a closure for the upper end of the tube comprising means to create an artificial fluid level within the tube for the operation of the hydrometer device, and clamp means adjustably engaging the body to clamp said closure and said tube in proper assembly with the body.

2. An indicator device for a cooling system of the type set forth, said indicator device comprising a transparent tube, a hollow body part upon which the tube rests in continuation of the hollow of said body part, a hydrometer device arranged within the hollow of said body part adapted to project into said tube, a closure for the upper end of the tube comprising means to create an artificial fluid level within the tube for the operation of the hydrometer device, a casing surrounding the tube and extending into engagement with the closure, said casing having an opening therethrough through which the hydrometer device is visible within the tube, and means interengaging between the casing and the body to detachably retain all of said parts assembled.

3. An indicator device for a cooling system of the type set forth, said indicator device comprising a transparent tube, a hollow body part upon which the tube rests in continuation of the hollow of said body part, a hydrometer device arranged within the hollow of said body part adapted to project into said tube, a manually operable pump arranged above the upper end of said tube by which air may be forced into said tube, a casing surrounding the tube and having a part engaging said pump, said casing having a window therethrough through which the hydrometer device is visible within the tube, said casing having an annular flange at its lower end, and a member rotatable upon said flange having threaded engagement with the body whereby to clamp all of said parts firmly to the body.

4. An indicator device for a cooling system of the type set forth, said indicator device comprising a transparent tube, a hollow body part upon which the tube rests in continuation of the hollow of said body part, a hydrometer device arranged within the hollow of said body part adapted to project into said tube, a partition member resting upon the upper annular edge of said tube, a smaller tube extending through said partition member downwardly into said transparent tube adapted for defining an artificial fluid level within said transparent tube, a cylindrical spacer engaging said partition member and extending thereabove in axial alignment with said transparent tube, a closure carried at the upper end of said spacer and co-operative therewith to define a valve-float chamber above said partition member, said closure having a vent opening therethrough, a float within said valve-float chamber, a valve member operable by said float to close said vent opening, a manually operable pump device arranged above said closure by means of which air may be forced downwardly through the vent opening of said closure and through said mentioned smaller tube into said transparent tube at will, a cylindrical casing for all of said parts, said casing having its lower portion encircling the transparent tube and formed with windows therethrough through which the hydrometer device is visible within the transparent tube, said casing having its upper portion encircling said spacer to retain the spacer in axial alignment with the transparent tube, said casing having an annular flange at its upper end engaging said pump, and means interengaging between the casing and the body adjustable to urge the casing toward the body for thereby clamping the pump and the closure against the upper end of the spacer and for in turn clamping the lower end of the spacer and the partition member against the upper end of the transparent tube, and also for clamping the lower end of the transparent tube to the body.

5. An indicator device for a cooling system of the type set forth, said indicator device comprising a transparent tube, a hydrometer device arranged within said tube, and means adapted to create and maintain an artificial fluid level within the tube for the operation of the hydrometer device, said means comprising a closure member having a vent opening therethrough, a valve for controlling said vent opening, a float for automatically operating said valve and a manually operable pump device intended to force air downwardly through said vent opening, said valve being shaped to provide an upwardly tapering cone at its lower portion adapted for closing the vent opening when the valve is lifted, said valve being shaped to provide a spindle continuing upwardly from the apex of the cone portion through the vent opening adapted to project above the upper surface of the closure member when the valve is lifted and to be engaged by the pump device for thereby moving the valve downwardly to open position upon operation of the pump device.

6. An indicator device for a cooling system of the type set forth, said indicator device comprising means providing a hydrometer-float chamber, a hydrometer device arranged within said chamber, means providing a passage-way by which fluid may enter said chamber for operating the hydrometer float, and means whereby the hydrometer-float chamber forming means is adjustable to open and close said passage-way at will.

7. An indicator device for a cooling system of the type set forth, said indicator device comprising means providing a hydrometer-float chamber, a hydrometer device arranged within said chamber, a base member upon which the hydrometer-float chamber forming means is supported, said base and said hydrometer-float chamber forming means having aligned openings therethrough providing a passage-way through which fluid may enter the hydrometer-float chamber for operating the hydrometer-float, and said hydrometer-float chamber forming means and said base being movable relative to each other for moving the openings thereof out of alignment and thereby closing said passage-way at will.

8. An indicator device for a cooling system of the type set forth, said indicator device comprising means providing a hydrometer-float, chamber, a hydrometer device arranged within said chamber, a base member upon which the hydrometer-float chamber forming means is supported, said base being shaped to provide a socket therein, said hydrometer-float chamber forming means being shaped to fit rotatably within said socket, said base and said hydrometer-float chamber forming means having aligned openings therethrough providing a passage-way through which fluid may enter the hydrometer-float chamber for operating the hydrometer-float, and said openings being movable out of alignment for thereby closing said passage-way upon rotation of the hydrometer-float chamber forming means.

9. An indicator device for a cooling system of the type set forth, said indicator device comprising a body member and a plurality of separately formed parts, a clamp member threaded upon the body rotatable in one direction to hold said parts assembled with the body and rotatable in the opposite direction to permit disassembly of said parts, a base upon which the body is supported, said base and body having aligned apertures therethrough providing a passage-way through which fluid may enter the indicator device, means whereby the body is connected with the base to rotate relative thereto coaxially with said clamp member for thereby moving the opening of the body into and out of alignment with the opening of the base at will, and means to insure non-alignment of said openings upon rotation of said clamp member in a direction to release the mentioned parts of the indicator device.

10. An indicator device for a cooling system of the type set forth, said indicator device comprising parts providing a hydrometer-float chamber, a base member upon which said hydrometer-float chamber forming part is mounted and by which it may be connected with the cooling system, said base member comprising a tubular extension for insertion through the wall of the hose commonly found in said cooling system, a nut threaded thereon within the hose, and a second nut threaded thereon exteriorly of the hose.

11. An indicator device for a cooling system of the type set forth, said indicator device comprising parts providing a hydrometer-float chamber, a base member upon which said hydrometer-float chamber forming part is mounted and by which it may be connected with the cooling system, said base member comprising a tubular extension for insertion through the wall of the hose commonly found in said cooling system, a nut threaded thereon within the hose, a clamp member slidable upon said extension exteriorly of the hose, means to retain said clamp member against rotation upon said extension, and a second nut threaded upon the extension exteriorly of the hose arranged to move said clamp member toward the exterior surface of the hose.

12. An indicator device for a cooling system of the type set forth, said indicator device comprising parts providing a hydrometer-float chamber, a base member upon which said hydrometer-float chamber forming part is mounted and by which it may be connected with the cooling system, said base member comprising a tubular extension for insertion through the wall of the hose commonly found in said cooling system, a nut threaded thereon within the hose, said nut having a convexed surface disposed to engage the curved interior surface of the hose, a clamp member slidable upon the extension exteriorly of the hose having a concaved surface for engaging the curved exterior surface of the hose, a washer slidable upon said extension beyond said clamp member, means to retain said washer against rotary movement upon the extension, and a second nut threaded upon the extension beyond said washer rotatable to move said washer and clamp member against the exterior surface of the hose at will.

13. In an indicator device for a cooling system of the type set forth, an attaching device by means of which to connect the indicator device with the cooling system, said attaching device comprising a tubular extension of the indicator device adapted for insertion through the wall of the hose commonly found in said cooling system, a nut threaded upon said extension within the hose, said nut having a convexed surface disposed to engage the curved interior surface of the hose, a clamp member slidable upon the extension exteriorly of the hose having a concaved surface for engaging the curved exterior surface of the hose, a washer slidable upon said extension beyond said clamp member, the extension having a longitudinal groove therein, the washer having a part slidable within said groove to retain the washer against rotary movement upon the extension, and a second nut threaded upon the extension beyond said washer rotatable to move said washer and clamp member against the exterior surface of the hose at will.

14. An indicator device for a cooling system of the type set forth, said indicator device comprising means providing a hydrometer-float chamber and including connections by which said means may be operatively connected with the cooling system also means by which fluid from the cooling system may enter the chamber, a hydrometer device arranged within the chamber, and said connections including also a valve device by which to control movement of fluid into said chamber, said valve device being made up in part of the walls of said chamber.

In testimony whereof we affix our signatures.

HOWARD E. CHRISTIE.
KIBBEY W. COUSE.